(12) United States Patent
He (10) Patent No.: US 12,128,662 B1
(45) Date of Patent: Oct. 29, 2024

(54) AIR BUBBLE REMOVER AND APPLICATOR FOR TEMPERED GLASS SCREEN PROTECTOR OF ELECTRONIC DEVICE

(71) Applicant: Shenzhen Zhihengda Technology Development Co., LTD, Shenzhen (CN)

(72) Inventor: Zhixiong He, Shenzhen (CN)

(73) Assignee: SHENZHEN ZHIHENGDA TECHNOLOGY DEVELOPMENT CO., LTD, Shenzhen (CN)

( * ) Notice: Subject to any disclaimer, the term of this patent is extended or adjusted under 35 U.S.C. 154(b) by 0 days.

(21) Appl. No.: 18/399,777

(22) Filed: Dec. 29, 2023

(30) Foreign Application Priority Data

Jul. 12, 2023 (CN) .......................... 202310859146.0

(51) Int. Cl.
*B32B 37/00* (2006.01)
*B32B 37/10* (2006.01)

(52) U.S. Cl.
CPC ........ *B32B 37/0053* (2013.01); *B32B 37/025* (2013.01); *B32B 37/10* (2013.01); *B32B 2307/748* (2013.01); *B32B 2457/20* (2013.01)

(58) Field of Classification Search
CPC .......................... B32B 37/0007; B32B 37/003
See application file for complete search history.

(56) References Cited

U.S. PATENT DOCUMENTS

| | | | | |
|---|---|---|---|---|
| 2015/0096679 A1* | 4/2015 | Ryan | ...................... | B42D 3/002 156/313 |
| 2015/0258759 A1* | 9/2015 | Kim | ................... | B32B 37/0053 156/60 |
| 2017/0001364 A1* | 1/2017 | MacDonald | ........ | B29C 65/7802 |

FOREIGN PATENT DOCUMENTS

| | | | | |
|---|---|---|---|---|
| CN | 216509370 U | | 5/2022 | |
| EP | 4230413 A1 * | | 8/2023 | ............. B29C 63/02 |

* cited by examiner

*Primary Examiner* — Christopher T Schatz
(74) *Attorney, Agent, or Firm* — Bayramoglu Law Offices LLC (57) ABSTRACT

An air bubble remover and an applicator for a tempered glass screen protector of an electronic device are provided. The air bubble remover includes a base and a rolling rod, where the base is provided with a mounting space for mounting an electronic device; the rolling rod is rotatably connected to the base and rotatable around a central axis of the rolling rod; and the rolling rod is automatically movable from one side of the mounting space across the mounting space to the other side of the mounting space, so as to remove a remaining air bubble between a tempered glass screen protector and the electronic device. When the rolling rod moves from one side of the mounting space across the mounting space to the other side of the mounting space, the rolling rod is abutted against the tempered glass screen protector to remove the remaining air bubble.

15 Claims, 9 Drawing Sheets

AIR BUBBLE REMOVER AND APPLICATOR FOR TEMPERED GLASS SCREEN PROTECTOR OF ELECTRONIC DEVICE

CROSS-REFERENCE TO THE RELATED APPLICATIONS

This application is based upon and claims priority to Chinese Patent Application No. 202310859146.0, filed on Jul. 12, 2023, the entire contents of which are incorporated herein by reference.

TECHNICAL FIELD

The present disclosure relates to the technical field of screen protector applicators, and in particular to an air bubble remover and an applicator for a tempered glass screen protector of an electronic device.

BACKGROUND

A phone can be placed inside an air bubble remover to facilitate a user to apply a screen protector to the phone. When the user applies the screen protector to the phone, there are air bubbles between the screen protector and the phone. The user needs to move a pressure element of the air bubble remover back and forth to remove the air bubbles, which will cause fatigue in the hand of the user, making it difficult for the user to operate.

Chinese Patent Application CN216509370U provides a screen protector applicator easy for air bubble removal. When a screen protector is applied to the phone, the user can drive the pressure element to move back and forth relative to an air bubble remover body through a traction element so as to remove air bubbles between the screen protector and the phone. However, during this process, the hand of the user is prone to fatigue, making it difficult for the user to operate.

SUMMARY

The present disclosure provides an air bubble remover and an applicator for a tempered glass screen protector of an electronic device. The present disclosure solves the problem that a user's hand needs to move back and forth to remove an air bubble between the screen protector and the phone, which will cause fatigue in the hand of the user, making it difficult for the user to operate.

In order to solve the above technical problem, the present disclosure employs a technical solution as follows:

A first aspect of the present disclosure provides an air bubble remover for a tempered glass screen protector, including:

a base, provided with a mounting space for mounting an electronic device; and a rolling rod, rotatably connected to the base and rotatable around a central axis of the rolling rod, where the rolling rod is automatically movable from one side of the mounting space across the mounting space to the other side of the mounting space, so as to remove a remaining air bubble between a tempered glass screen protector and the electronic device.

A second aspect of the present disclosure provides an applicator for a tempered glass screen protector of an electronic device, including:

a tempered glass screen protector; and the air bubble remover for a tempered glass screen protector, where the electronic device is placed in the mounting space, and the tempered glass screen protector is adhered to a display screen of the electronic device; and when the rolling rod moves, the rolling rod rolls along a surface of the tempered glass screen protector and compresses the tempered glass screen protector to remove a remaining air bubble between the tempered glass screen protector and the electronic device.

According to the above technical solutions, embodiments of the present disclosure have at least the following advantages and beneficial effects.

The present disclosure provides an air bubble remover and an applicator for a tempered glass screen protector of an electronic device. In the present disclosure, the rolling rod is automatically movable from one side of the mounting space across the mounting space to the other side of the mounting space. In addition, during the movement process, the rolling rod is abutted against the tempered glass screen protector to remove the remaining air bubble between the tempered glass screen protector and the electronic device. The design reduces the operation by the hand of the user and avoids fatigue in the hand of the user, making it easy for the user to operate.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and those of ordinary skill in the art may still derive other drawings from these drawings without creative efforts.

REFERENCE NUMERALS

1. air bubble remover; 2. electronic device; and 3. applicator;

10. base; 20. rolling rod; 30. movable plate; 40. elastic element; 60. drive motor; 70. first rotating ring; 80. second rotating ring; 90. button; and 100. mounting frame; and

101. mounting space; 114. gear rack; 115. first fixing plate; 116. second fixing plate; 117. sliding groove; 118. first hook; 119. second hook; 120. third protrusion; 121. fourth protrusion; 122. first plate; 123. second plate; 124. mounting trough; 125. first clamping post; 126. limiting hole; 127. clamping element; 128. perforation; 129. second clamping post; 130. limiting element; 140. tempered glass screen protector; 141. screen protector body; 142. protective layer; 143. release layer; 144. first limiting portion; 145. second limiting portion; 146. movable end; 147. first clamping hole; 148. second clamping hole; 149. release layer body; 150. pull tab; 303. gear; 304. first housing; and 305. second housing.

DETAILED DESCRIPTION OF THE EMBODIMENTS

The typical implementations embodying the features and advantages of the present disclosure are described in detail below. It should be understood that the present disclosure may have various changes in different implementations, which do not depart from the scope of the present disclosure. The description and drawings herein are essentially used for the purpose of explanation, rather than to limit the present disclosure.

In addition, the terms "first" and "second" are merely intended for a purpose of description, and shall not be understood as an indication or implication of relative importance or implicit indication of a quantity of indicated technical features. Therefore, the features defined by "first" and "second" can explicitly or implicitly include one or more features. In the description of the present disclosure, "multiple" means two or more, unless otherwise specifically defined.

In the description of the present disclosure, it should be noted that, unless otherwise clearly specified, meanings of terms "mount", "connect with", and "connect to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand the specific meanings of the above terms in the present disclosure based on specific situations.

First Embodiment

Figure 1:
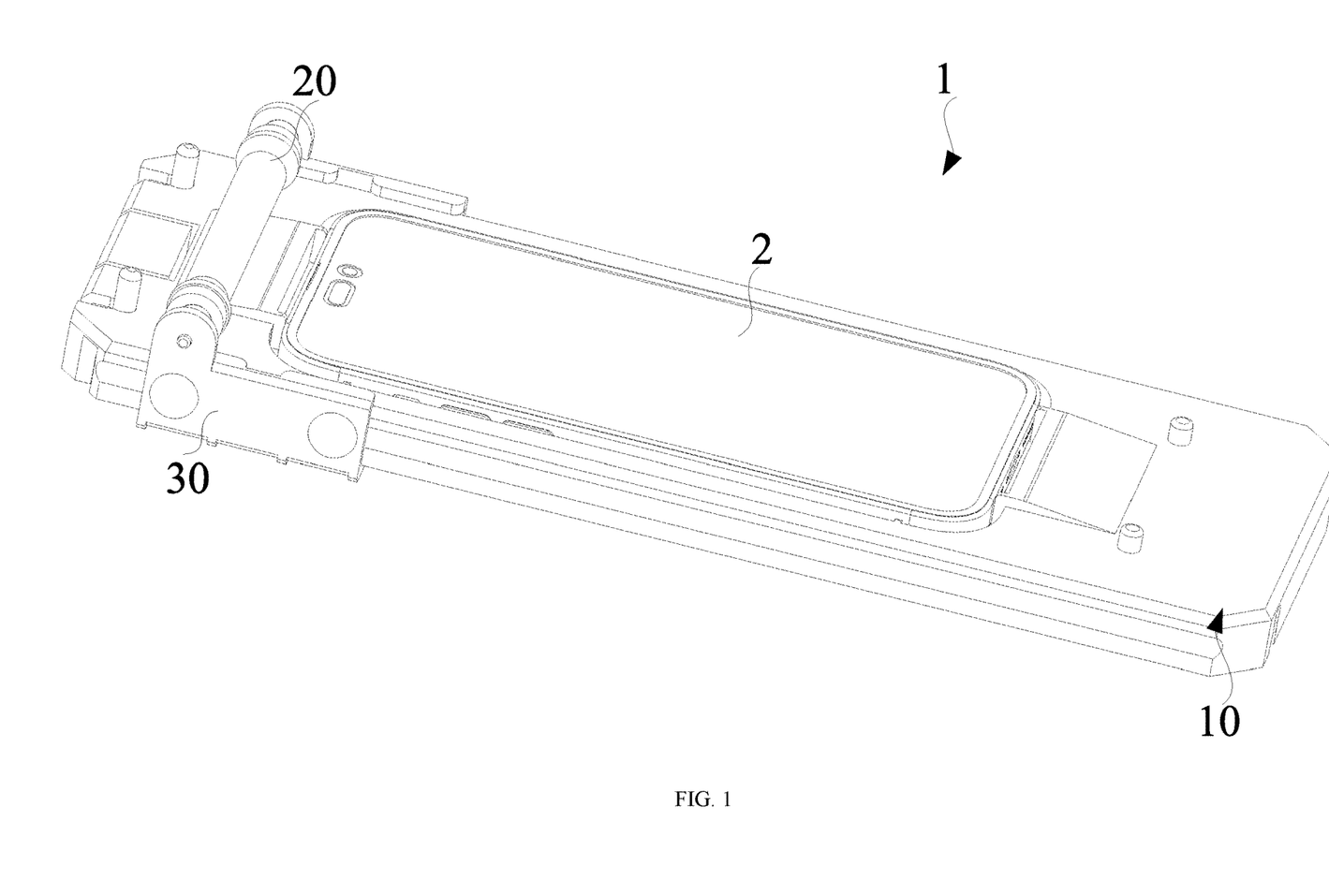
FIG. 1 is a schematic diagram of an air bubble remover for a tempered glass screen protector in a usage state according to a first embodiment of the present disclosure.

Referring to FIG. 1, the present disclosure provides air bubble remover 1 for a tempered glass screen protector. The electronic device 2 is fixed to the air bubble remover 1 to facilitate a user to apply a tempered glass screen protector to a screen of the electronic device 2. After adhering the tempered glass screen protector to the screen, the user can operate the air bubble remover 1 to remove the remaining air bubble between the tempered glass screen protector and the electronic device 2, making the tempered glass screen protector better adhere to the electronic device 2 and making it easy for the user to operate. The electronic device 2 can but is not limited to a smartphone and a tablet. Of course, the electronic device 2 can also be placed on the air bubble remover 1 after the tempered glass screen protector is adhered to the electronic device, so as to complete the air bubble removal process.

It should be noted that in addition to the tempered glass screen protector, the screen protector for the electronic device can also be a high-transparency screen protector, an anti-peeping screen protector, a frosted screen protector, etc. Therefore, the present disclosure does not impose any limitations on the type of the screen protector for the electronic device.

Figure 2:
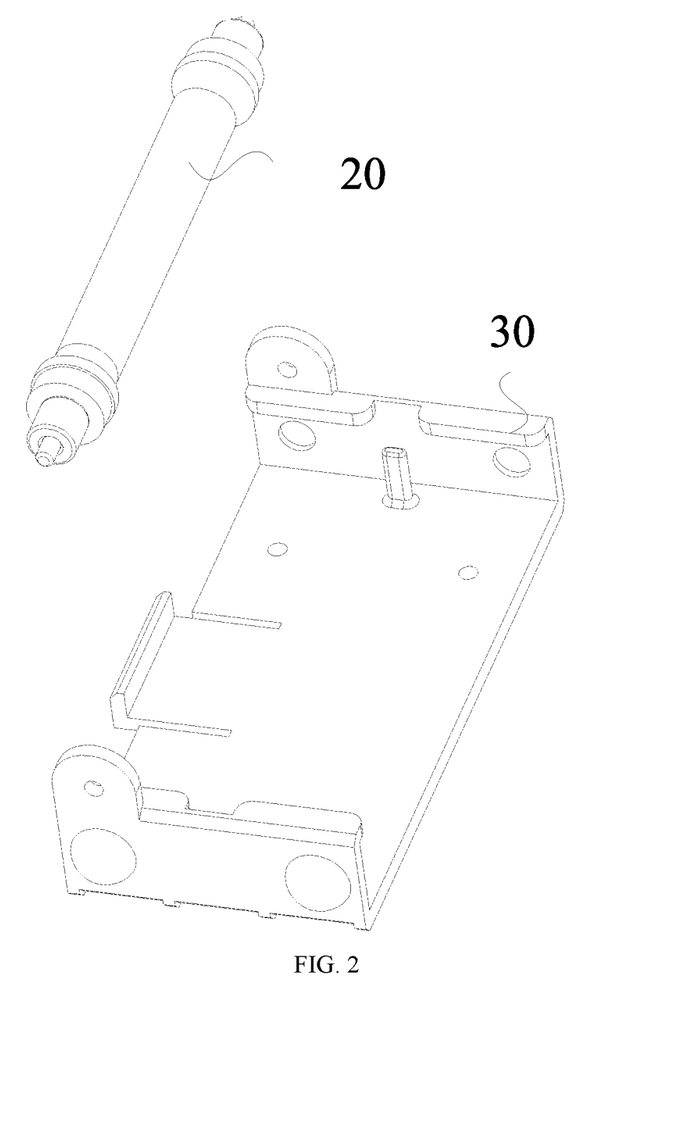
FIG. 2 is an exploded view of a rolling rod and a movable plate shown in FIG. 1.

Referring to FIG. 2, the air bubble remover 1 includes base 10 and rolling rod 20. The base 10 is provided with mounting space 101 for mounting the electronic device 2. FIG. 2 shows that the mounting space 101 is a trough structure surrounded by a closed ring. It is understandable that in other embodiments, the mounting space 101 can also be a clamping space surrounded by multiple limiting members. The rolling rod 20 is rotatably connected to the base 10 and is rotatable around a central axis of the rolling rod 20. After the tempered glass screen protector is adhered to the electronic device 2, the rolling rod 20 is automatically movable from one side of the mounting space 101 across the mounting space 101 to the other side of the mounting space 101. During the movement process, the rolling rod 20 rolls along a surface of the tempered glass screen protector and compresses the tempered glass screen protector to remove a remaining air bubble between the tempered glass screen protector and the electronic device 2, making the tempered glass screen protector better adhered to the electronic device 2.

It should be noted that since the rolling rod 20 is rotatable around the central axis thereof, when the rolling rod 20 compresses the tempered glass screen protector, the rolling rod 20 compresses the tempered glass screen protector by rolling. The design prevents the rolling rod 20 from scratching the tempered glass screen protector, thereby providing protection for the tempered glass screen protector.

In summary, in the present disclosure, the rolling rod 20 is automatically movable from one side of the mounting space 101 across the mounting space 101 to the other side of the mounting space 101. In addition, during the movement process, the rolling rod 20 is abutted against the tempered glass screen protector to remove the remaining air bubble between the tempered glass screen protector and the electronic device 2. The design reduces the operation by the hand of the user and avoids fatigue in the hand of the user, making it easy for the user to operate.

Figure 3:
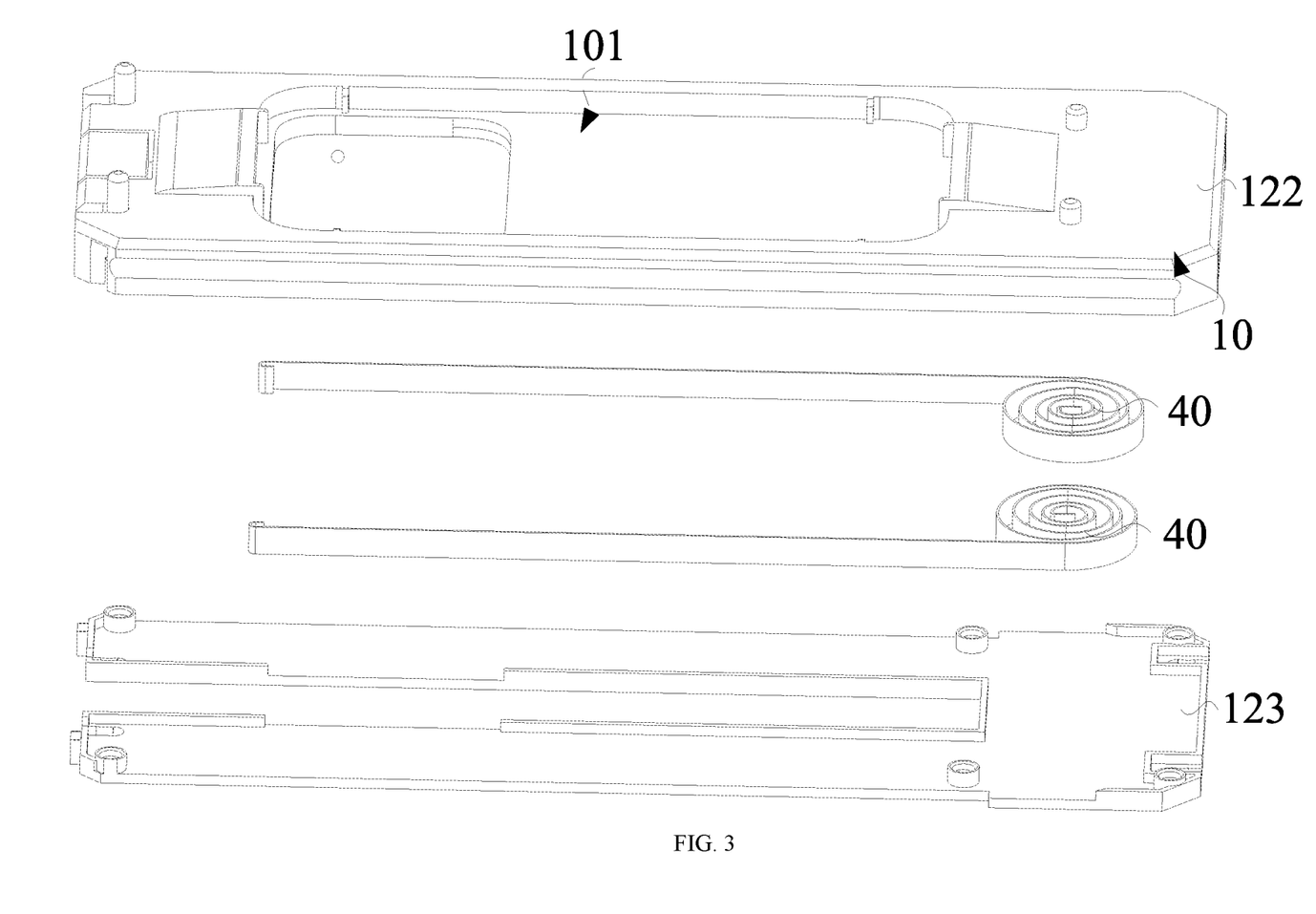
FIG. 3 is an exploded view of a base shown in FIG. 2.
Figure 4:
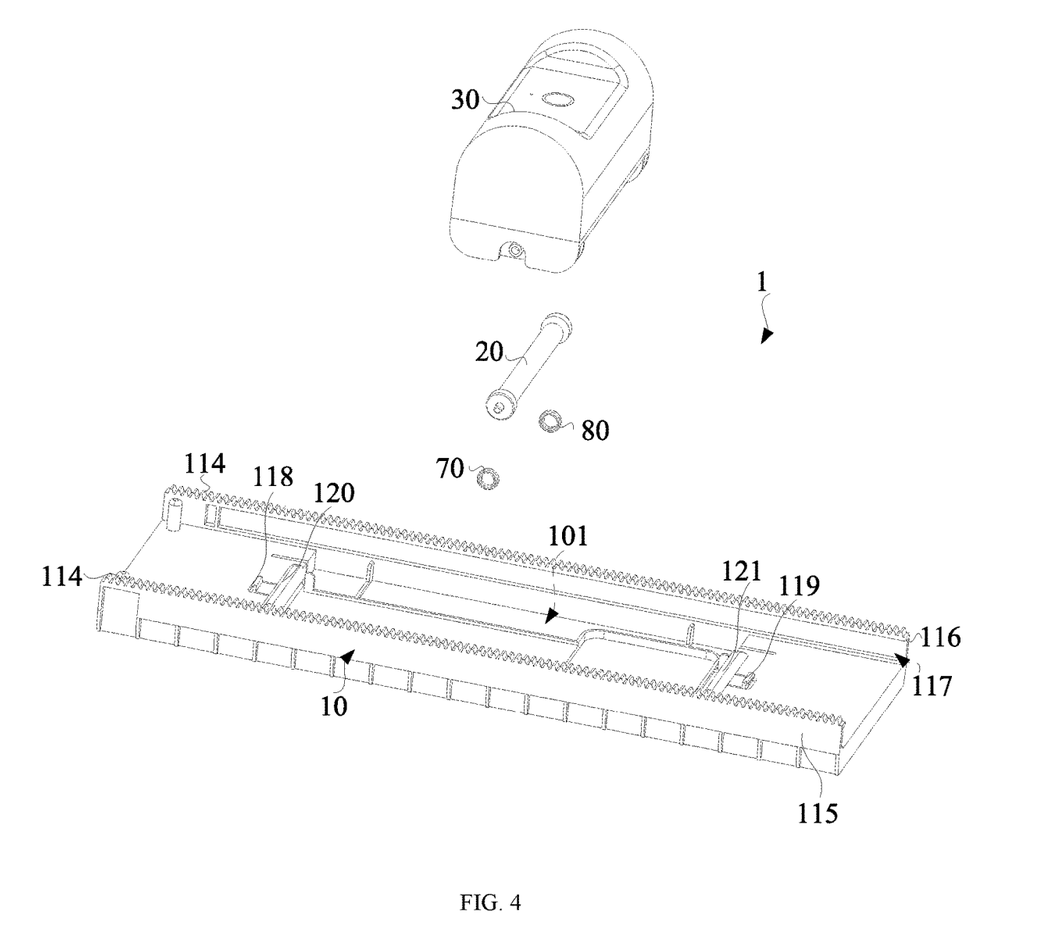
FIG. 4 is an exploded view of an air bubble remover for a tempered glass screen protector according to a second embodiment of the present disclosure.
Figure 5:
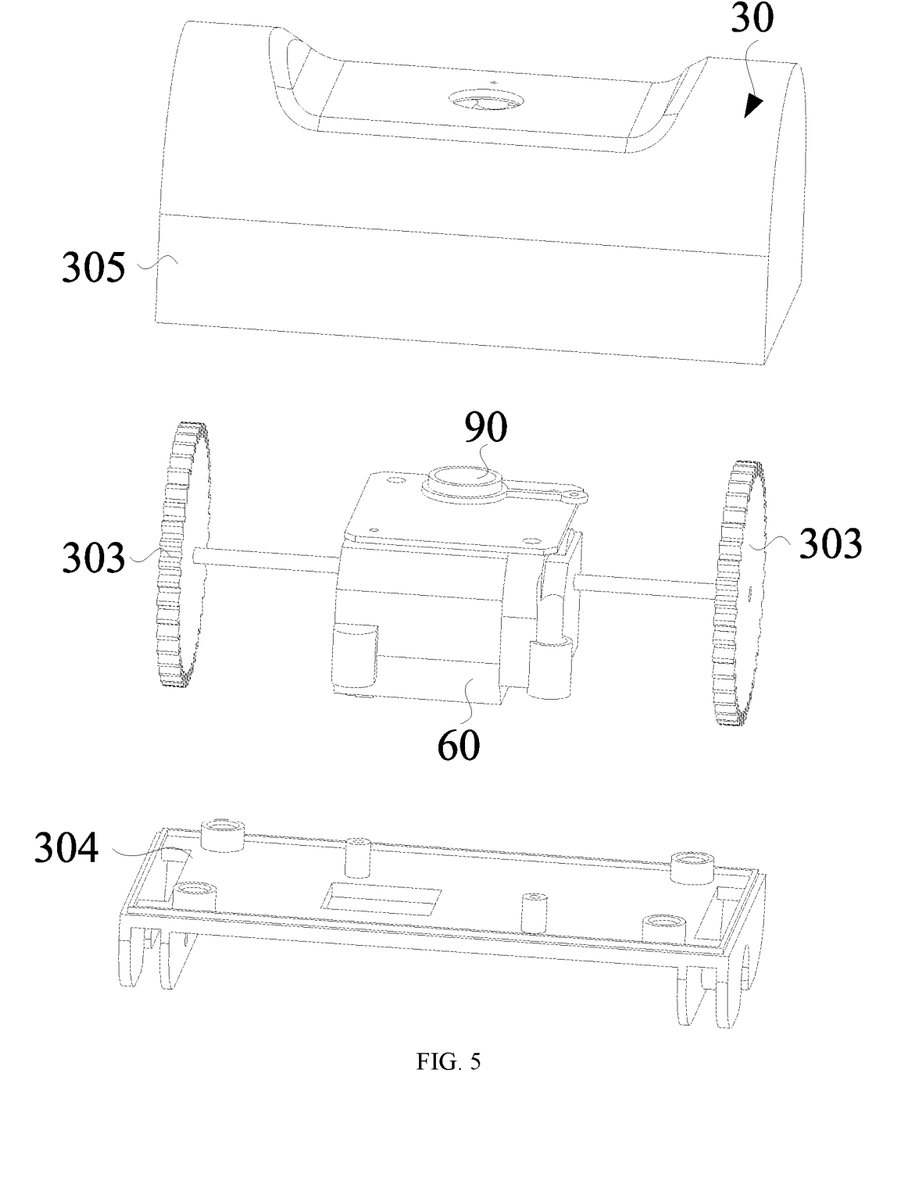
FIG. 5 is an exploded view of a movable plate shown in FIG. 4.

Referring to FIGS. 2 and 3, in an embodiment, the air bubble remover 1 includes movable plate 30 and elastic elements 40. The movable plate 30 is movably connected to the base 10. The rolling rod 20 is rotatably connected to the movable plate 30. The elastic elements 40 are provided between the movable plate 30 and the base 10. Specifically, under an external force, the movable plate 30 can overcome an elastic force of the elastic elements 40 and move relative to the base 10, so as to drive the rolling rod 20 to move from one side of the mounting space 101 to the other side of the mounting space 101, and the movement of the movable plate 30 causes the elastic elements 40 to accumulate a reset elastic force. Meanwhile, if there is no external force acting on the movable plate 20, the elastic elements 40 can release the reset elastic force so as to drive the movable plate 20 to move in reverse relative to the base 10 to reset. The reset of the movable plate 20 drives the reset of the rolling rod 20, and the reset process can achieve the air bubble removal process of the tempered glass screen protector.

It should be noted that due to the elastic elements 40, the movable plate 30 can automatically drive the rolling rod 20 to reset. During this process, the user does not need to manually operate. The design avoids the problem that the user operates the movable plate 30 back and forth, thereby avoiding fatigue in the hand of the user, making it easy for the user to operate.

It should be understood that in this embodiment, the elastic elements 40 are coil springs located inside the base 10. The coil springs each include a fixed end connected to the base 10 and a free end connected to the movable plate 30. It is understandable that in other embodiments, the elastic elements 40 can also be tension springs. The tension springs are provided inside the base 10 and each include two opposite ends that are respectively connected to the base 10 and the movable plate 30. Therefore, the present disclosure does not impose any limitations on the specific type of the elastic elements 40.

It should be explained that in this embodiment, there are two elastic elements 40 located at two opposite sides of the base 10. It is understandable that in other embodiments, there can be one or multiple elastic elements 40. Therefore, the present disclosure does not impose any limitations on the quantity of the elastic elements 40.

As shown in FIG. 1, when the movable plate 30 is connected to the base 10, the movable plate 30 is sleeved onto the base 10 to make the movable plate 30 movably connected to the base 10. It is understandable that in other embodiments, the movable plate 30 may not be sleeved onto the base 10, but the movable plate 30 is clamped onto two opposite sides of the base 10 and is movable back and forth relative to the base 10. Alternatively, the movable plate 30 is omitted. In this case, two opposite ends of the base 10 are respectively provided with limiting plates, and the limiting plates are provided with movement grooves. Two opposite ends of the rolling rod 20 are respectively accommodated in the movement grooves, and the rolling rod 20 is movable relative to the base 10 along the movement grooves under an external force. When there is no external force driving the rolling rod 20, the rolling rod 20 is movable in reverse along the movement grooves to reset under the reset elastic forces of the elastic elements 40.

Referring to FIG. 3, in an embodiment, the base 10 includes detachable first plate 122 and second plate 123. The first plate 122 is provided with the mounting space 101, and the second plate 123 is connected to a side of the first plate 122 away from the mounting space 101. The movable plate 30 is sleeved onto the first plate 122 and the second plate 123, and is movably connected to the first plate 122. The elastic elements 40 are fixed between the first plate 122 and the second plate 123.

It is understandable that in other embodiments, the first plate 122 and the second plate 123 can be fixedly connected. In this case, the first plate 122 and the second plate 123 are integrated.

Second Embodiment

Figure 6:
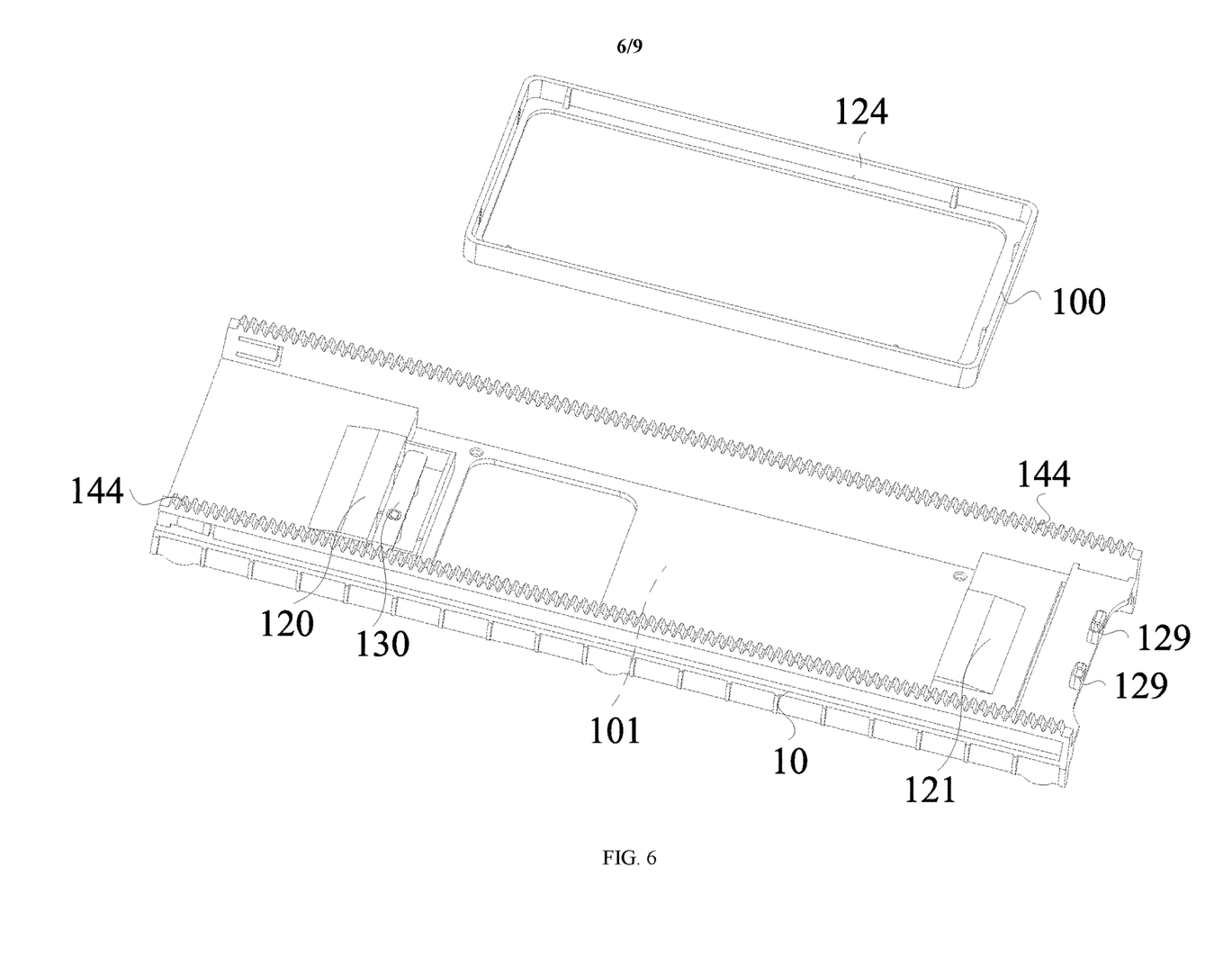
FIG. 6 is an exploded view of a base and a mounting frame according to a third embodiment of the present disclosure.
Figure 7:
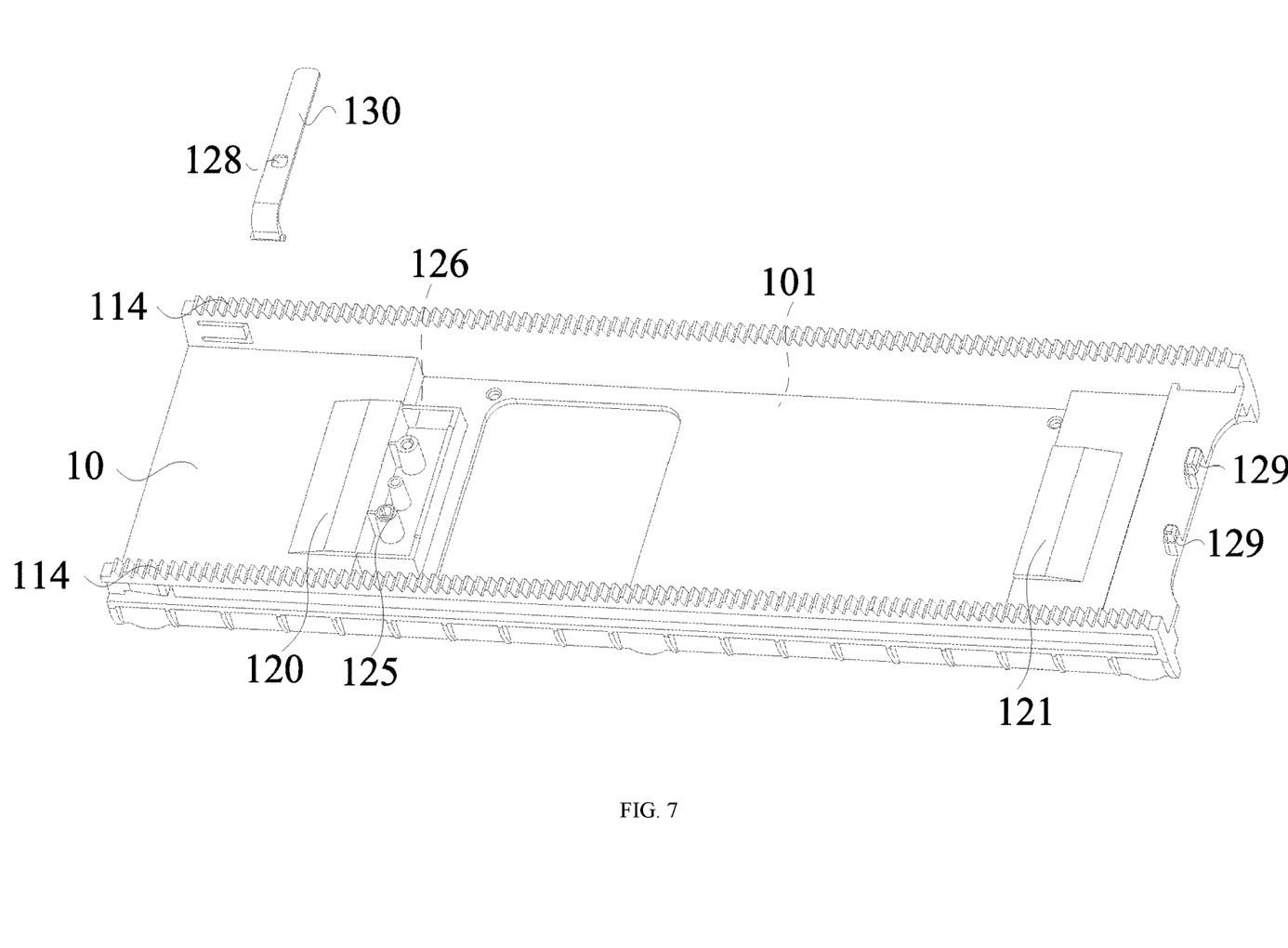
FIG. 7 is an exploded view the base and a limiting element shown in FIG. 6.

Referring to FIGS. 6 and 7, the structure of the air bubble remover 1 in this embodiment is basically the same as that of the air bubble remover 1 in the first embodiment, except that in this embodiment, the elastic elements 40 are omitted. Specifically, in this embodiment, the air bubble remover 1 includes drive motor 60. The drive motor 60 is located on the movable plate 30. The drive motor 60 can be electrically driven so as to enable the rolling rod 20 to move back and forth relative to the base 10 through the movable plate 30.

It should be noted that in this embodiment, the drive motor 60 is powered by an external power source. It is understandable that in other embodiments, the air bubble remover 1 can also be provided with a battery to supply power to the drive motor 60. Therefore, the present disclosure does not impose any limitations on the specific implementation of the power supply for the drive motor 60.

Referring to FIGS. 6 and 7, in an embodiment, the movable plate 30 is provided with gears 303. The gears 303 are connected to the drive motor 60. The base 10 is provided with gear racks 114 that mesh with the gears 303. Specifically, the drive motor 60 can drive the gears 303 to rotate relative to the gear racks 114, causing the movable plate 30 to drive the rolling rod 20 to move back and forth relative to the base 10.

It should be noted that in this embodiment, the movable plate 30 and the rolling rod 20 are located at a same side of the base 10. There are two gears 303 located at two opposite ends of the movable plate 30. There are two gear racks 114 located at two opposite ends of the base 10. It is understandable that in other embodiments, there may be one gear 303 and one gear rack 114. In this case, the movable plate 30 is sleeved onto the base 10, and the movable plate 30 and the rolling rod 20 are respectively located at two opposite sides of the base 10. The gear 303 is located in a middle of the movable plate 30. The gear rack 114 is located between the movable plate 30 and the base 10, and the gear rack 114 is located in a middle of the base 10. Therefore, the present disclosure does not impose any limitations on the specific arrangement of the gear 303 and the gear rack 114.

Referring to FIGS. 6 and 7, in an embodiment, the two opposite ends of the base 10 are respectively provided with first fixing plate 115 and second fixing plate 116. The first fixing plate 115 and the second fixing plate 116 are respectively provided with sliding grooves 117. The two gear racks 114 are respectively provided on the first fixing plate 115 and the second fixing plate 116. The two opposite ends of the movable plate 30 are respectively movably connected to the first fixing plate 115 and the second fixing plate 116. The air bubble remover 1 includes first rotating ring 70 and second rotating ring 80. The first rotating ring 70 and the second rotating ring 80 are respectively connected to the two opposite ends of the rolling rod 20 and stored in the sliding grooves 117. Specifically, when the rolling rod 20 moves relative to the base 10, the rolling rod 20 drives the first rotating ring 70 and the second rotating ring 80 to move along the sliding grooves 117, respectively. During the movement process, the rolling rod 30 is rotatable around the central axis of the rolling rod 20 relative to the first rotating ring 70 and the second rotating ring 80. Due to the sliding grooves 117, the first rotating ring 70, and the second rotating ring 80, when the rolling rod 20 moves relative to the base 10, the two opposite ends of the rolling rod 20 are subjected to even forces, resulting in smooth movement of the rolling rod 20.

It is understandable that in other embodiments, the first rotating ring 70 and the second rotating ring 80 can be omitted. In this case, the air bubble remover 1 includes two rotating bearings. The arrangement method of the two rotating bearings is the same as that of the first rotating ring 70 and the second rotating ring 80. Therefore, the present disclosure does not impose any limitations on the specific arrangement of the first rotating ring 70 and the second rotating ring 80.

Referring to FIG. 6, in an embodiment, the base 10 is provided with first hook 118, second hook 119, third protrusion 120, and fourth protrusion 121. The first hook 118 and the second hook 119 are located at two opposite ends of the mounting space 101, respectively. The third protrusion 120 and the fourth protrusion 121 are respectively located at the two opposite ends of the mounting space 101 and between the first hook 118 and the second hook 119. Specifically, when the rolling rod 20 moves relative to the base 10, the rolling rod 20 can be limited between the first hook 118 and the third protrusion 120, so as to limit reverse movement of the rolling rod 20 relative to the base 10. Meanwhile, the rolling rod 20 can break free from the limitation between the first hook 118 and the third protrusion 120 so as to move in reverse relative to the base 10 and be clamped between the second hook 119 and the fourth protrusion 121, thereby limiting continued movement of the rolling rod 20 relative to the base 10.

Referring to FIG. 7, in an embodiment, the movable plate 30 includes first housing 304 and second housing 305 that are detachably connected. Two opposite ends of the first housing 304 are respectively movably connected to the first fixing plate 115 and the second fixing plate 116 such that the movable plate 30 is movably connected to the base 10. The first housing 304 is configured to mount the drive motor 60, and the second housing 305 is configured to cover the drive motor 60 and the gears 303 between the first housing 304 and the second housing 305. The two opposite ends of the rolling rod 20 are movably connected to the two opposite ends of the first housing 304. It is understandable that in other embodiments, the first housing 304 and the second housing 305 may be fixedly connected. Alternatively, the second housing 305 are omitted, and in this case, the drive motor 60 is provided inside the first housing 304.

Referring to FIG. 7, the air bubble remover 1 further includes button 90. The button 90 is electrically connected to the drive motor 60, and the button 90 is exposed outside the second housing 305 for user operation. When the button 90 is pressed, the power source supplies power to the drive motor 60, and the drive motor 60 is in an on state. Thus, the drive motor 60 drives the gears 303 to rotate relative to the gear racks 114, such that the movable plate 30 drives the rolling rod 20 to move back and forth relative to the base 10. When the button 90 is pressed again, the drive motor 60 is disconnected from the power source, and the drive motor 60 is in an off state.

Third Embodiment

Figure 8:
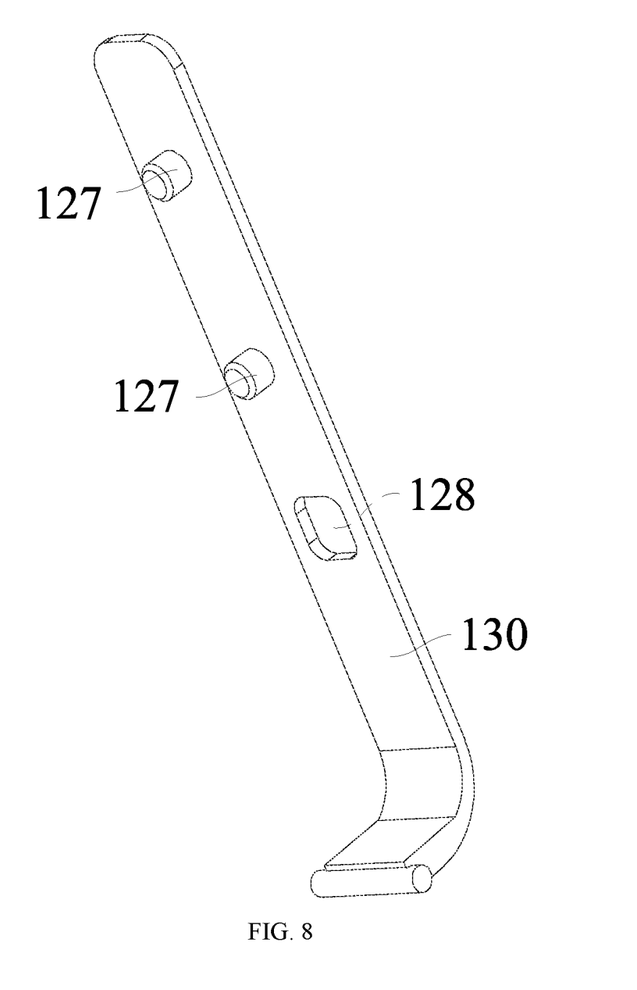
FIG. 8 is a structural diagram of the limiting element shown in FIG. 7 from another perspective.

Referring to FIG. 8, the structure of the air bubble remover 1 in this embodiment is basically the same as that of the air bubble remover 1 in the second embodiment, except that in this embodiment, the first hook 118 and the second hook 119 can be omitted.

Specifically, in this embodiment, the air bubble remover 1 further includes mounting frame 100. The mounting frame 100 is detachably provided in the mounting space 101. The mounting frame 100 is adapted to the mounting space 101 to limit the mounting frame 100 within the mounting space 101 and prevent the mounting frame 100 from loosening within the mounting space 101. The mounting frame 100 is provided with mounting trough 124. The electronic device 2 is placed in the mounting trough 124 to fix the electronic device 2.

It should be noted that the size of the mounting trough 124 depends on the specific size of the electronic device 2, such that mounting trough 124 can adapt to different sizes of electronic devices 2.

Figure 9:
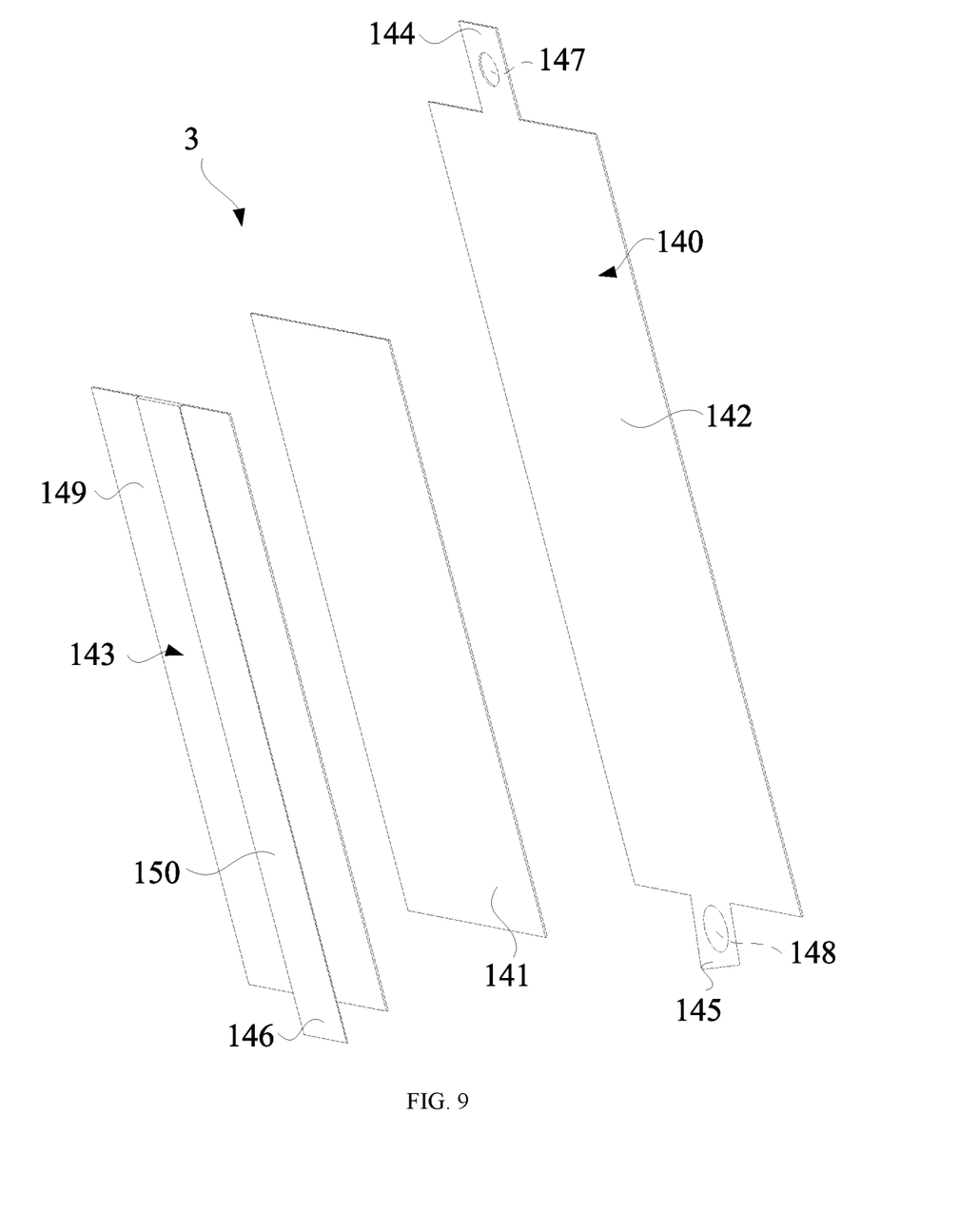
FIG. 9 is an exploded view of a tempered glass screen protector according to a fourth embodiment of the present disclosure.

Referring to FIG. 9, in an embodiment, the base 10 is further provided with first clamping posts 125. The first clamping posts 125 are located between the third protrusion 120 and the mounting frame 100. An end of the tempered glass screen protector can be clamped to the first clamping post 125 to limit the movement of the tempered glass screen protector along the two opposite sides of the mounting space 101, thereby facilitating the adhesion of the tempered glass screen protector to the electronic device 2.

It should be noted that in this embodiment, there are three first clamping posts 125, and the three first clamping posts 125 are spaced along a width direction of the base 10. It is understandable that in other embodiments, there may be one or multiple first clamping posts 125.

Referring to FIG. 9, in an embodiment, the air bubble remover 1 further includes limiting element 130. An end of the limiting element 130 is rotatably connected to the base 10. The limiting element 130 is rotatable relative to the base 10 so as to be clamped to the first clamping post 125 to prevent the tempered glass screen protector clamped to the first clamping post 125 from detaching from the first clamping post 125.

Referring to FIGS. 9 and 10, in an embodiment, the first clamping post 125 is provided with limiting hole 126, and the limiting element 130 is provided with clamping elements 127. When the limiting element 130 is clamped to the first clamping post 125, the clamping element 127 is stored in the limiting hole 126 to limit reverse rotation of the limiting element 130, so as to prevent the limiting element from detaching from the first clamping post 125.

It should be noted that in other embodiments, the clamping element 127 can be omitted. In this case, the limiting hole 126 is provided at the limiting element 130 and does not penetrate through the limiting element 130. When the limiting element 130 is clamped to the first clamping post 125, an end of the first clamping post 125 is clamped to the limiting hole 126. The quantity of the limiting holes 126 and the quantity of the clamping elements 127 correspond to the quantity of the first clamping posts 125.

Referring to FIG. 10, in an embodiment, the limiting element 130 is provided with perforation 128. When the limiting element 130 is clamped to the first clamping post 125, the first clamping post 125 passes through the perforation 128 to clamp the limiting element 130, so as to limit the reverse rotation of the limiting element 130, thereby preventing the limiting element from detaching from the first clamping post 125.

It should be noted that in case of the perforation hole 128, the quantity of the clamping elements 127 is at least one less than the quantity of the first clamping posts 125. Thus, one first clamping post 125 passes through the perforation 128 to clamp the limiting element 130, so as to limit reverse rotation of the limiting element 130 relative to the base 10, thereby preventing the limiting element from detaching from the first clamping post 125. It is understandable that in other embodiments, there may be multiple perforations 128, and the multiple perforations 128 may be spaced along a length direction of the limiting element 130. In this case, there is at least one clamping element 127, such that multiple first clamping posts 125 pass through the multiple perforations 128 and one clamping element 127 is stored in the limiting hole 126 of the first clamping post 125.

Referring to FIG. 9, in an embodiment, the base 10 is further provided with second clamping posts 129. The second clamping posts 129 are located at a side of the base 10 away from the first clamping posts 125 and at a side of the mounting frame 100. When one end of the tempered glass screen protector is clamped to the first clamping posts 125, the other end of the tempered glass screen protector is clamped to the second clamping posts 129 to fix the position of the tempered glass screen protector, thereby facilitating application.

It should be noted that in this embodiment, there are two second clamping posts 129, and the two second clamping posts are spaced along the width direction of the base 10. It is understandable that in other embodiments, there may be one or multiple second clamping posts 129.

Fourth Embodiment

Referring to FIG. 11, the present disclosure further provides applicator 3 for a tempered glass screen protector of an electronic device. The applicator 3 includes the air bubble remover 1 and the tempered glass screen protector 140. The electronic device 2 is placed in the mounting trough 124, and a bonding surface of the tempered glass screen protector 140 is adhered to a display screen of the electronic device 2. The rolling rod 20 rolls along the surface of the tempered glass screen protector 140 and compresses the tempered glass screen protector 140 to remove the remaining air bubble between the tempered glass screen protector 140 and the electronic device 2, making the tempered glass screen protector 140 better adhered to the electronic device 2.

Referring to FIG. 11, in an embodiment, the tempered glass screen protector 140 includes screen protector body 141, protective layer 142, and release layer 143. The protective layer 142 and the release layer 143 are respectively bonded to two opposite sides of the screen protector body 141. The protective layer 142 is located at a side of the screen protector body 141 away from the electronic device 2. Two opposite ends of the protective layer 142 are respectively provided with first limiting portion 144 and second limiting portion 145. The release layer 143 is located at a side of the screen protector body 141 close to the electronic device 2. The release layer 143 is provided with movable end 146 extending out of the screen protector body 141.

After the electronic device 2 is placed in the mounting trough 124, the first limiting portion 144 and the second limiting portion 145 are respectively clamped to the first clamping post 125 and the second clamping post 129 to limit the movement of the tempered glass screen protector 140 along the two opposite sides of the mounting space 101, so as to fix the position of the tempered glass screen protector 140. The limiting element 130 is driven to rotate relative to the base 10 and be clamped to the first clamping post 125, so as to prevent the first limiting portion 144 from detaching from the first clamping post 125. The movable end 146 is pulled to drive the release layer 143 to detach from the screen protector body 141, such that the bonding surface of the screen protector body 141 is adhered to the display screen of the electronic device 2. After the screen protector body 141 is adhered, the rolling rod 20 rolls along a surface of the protective layer 142 and compresses the protective layer 142 to remove the remaining air bubble between the screen protector body 141 and the electronic device 2, making the tempered glass screen protector 140 better adhered to the electronic device 2. After the air bubble is removed, the first limiting portion 144 and the second limiting portion 145 respectively detach from the first clamping post 125 and the second clamping post 129, such that the protective layer 142 detaches from the screen protector body 141, thereby applying the tempered glass screen protector 140 to the electronic device 2.

It should be noted that in this embodiment, the first limiting portion 144 and the second limiting portion 145 are respectively provided with first clamping hole 147 and second clamping hole 148. The first clamping post 125 and the second clamping post 129 are respectively inserted into the first clamping hole 147 and the second clamping hole 148, such that the first limiting portion 144 is clamped to the first clamping post 125 and the second limiting portion 145 is clamped to the second clamping post 129. A quantity of the first clamping holes 147 corresponds to a quantity of the first clamping posts 125, and a quantity of the second clamping holes 148 corresponds to a quantity of the second clamping posts 129.

As shown in FIG. 11, the release layer 143 includes release layer body 149 and pull tab 150. The release layer body 149 is bonded to a side of the screen protector body 141 away from the protective layer 142 to prevent dust contamination on the bonding surface of the screen protector body 141. The pull tab 150 includes an end connected to an end of the release layer body 149 and located at one side of the release layer body 149 away from the screen protector body 141 and the other end extending out of the screen protector body 141. The end of the pull tab 150 extending out of the screen protector body 141 forms the movable end 146. When the first limiting portion 144 and the second limiting portion 145 are respectively clamped to the first clamping post 125 and the second clamping post 129, the user can pull the end of the pull tab 150 extending out of the screen protector body 141. Thus, the pull tab 150 drives the release layer body 149 to detach from the screen protector body 141 between the electronic device 2 and the screen protector body 141, such that the bonding surface of the screen protector body 141 is adhered to the display screen of the electronic device 2. In this way, the screen protector body 141 is applied to the electronic device 2.

It should be noted that the pull tab 150 is pulled to detach the release layer body 149 from the screen protector body 141. During this process, the release layer body 149 does not need to detach from the screen protector body 141 in advance, avoiding dust contamination when the screen protector body 141 approaches the electronic device 2, thereby achieving dust-free application.

It should be noted that in other embodiments, the tempered glass screen protector 140 can also be a normal screen protector. In this case, the two opposite ends of the protective layer 142 are not provided with the first limiting portion 144 and the second limiting portion 145, and the release layer 143 is not provided with the pull tab 150.

The present disclosure is described above with reference to several typical implementations. It should be understood that the terms used herein are intended for illustration, rather than limiting. The present disclosure may be specifically implemented in many forms without departing from the spirit or essence of the present disclosure. Therefore, it should be understood that the above embodiments are not limited to any of the above-mentioned details, but should be broadly interpreted according to the spirit and scope defined by the appended claims. Therefore, any changes and modifications falling within the claims or the equivalent scope thereof should be covered by the appended claims.

What is claimed is:

1. An air bubble remover for a tempered glass screen protector, comprising:
a base, provided with a mounting space for mounting an electronic device;
a rolling rod, rotatably connected to the base and rotatable around a central axis of the rolling rod, wherein the rolling rod is automatically movable from a first side of the mounting space across the mounting space to a second side of the mounting space to remove a remaining air bubble between a tempered glass screen protector and the electronic device;
a drive motor, wherein the drive motor is allowed to drive the rolling rod to move back and forth relative to the base, making the rolling rod movable between the first side of the mounting space and the second side of the mounting space; and a movable plate, wherein the movable plate is movably connected to the base and provided with at least one gear; the base is provided with at least one gear rack, the at least one gear rack meshes with the at least one gear;

the rolling rod is rotatably connected to the movable plate to make the rolling rod rotatable around the central axis of the rolling rod;

the drive motor is provided on the movable plate and connected to the at least one gear and the drive motor is allowed to drive the at least one gear to rotate relative to the at least one gear rack, wherein the movable plate drives the rolling rod to move back and forth relative to the base.

2. The air bubble remover for the tempered glass screen protector according to claim 1, wherein the air bubble remover further comprises a button; the button is electrically connected to the drive motor; when the button is pressed, a power source supplies power to the drive motor, and the drive motor is in an on state; and when the button is pressed again, the power source is disconnected from the drive motor, and the drive motor is in an off state.

3. The air bubble remover for the tempered glass screen protector according to claim 1, wherein, the at least one gear comprises two gears located at two opposite ends of the movable plate; and the at least one gear rack comprises two gear racks located at two opposite ends of the base.

4. The air bubble remover for the tempered glass screen protector according to claim 3, wherein the two opposite ends of the base are respectively provided with a first fixing plate and a second fixing plate;

the first fixing plate and the second fixing plate are respectively provided with sliding grooves;

the two gear racks are respectively provided on the first fixing plate and the second fixing plate;

the two opposite ends of the movable plate are respectively movably connected to the first fixing plate and the second fixing plate;

the air bubble remover further comprises a first rotating ring and a second rotating ring;

the first rotating ring and the second rotating ring are respectively connected to two opposite ends of the rolling rod and stored in the sliding grooves;

when the rolling rod moves relative to the base, the rolling rod drives the first rotating ring and the second rotating ring to move along the sliding grooves, respectively; and during movement, the rolling rod is rotatable around the central axis of the rolling rod relative to the first rotating ring and the second rotating ring.

5. The air bubble remover for the tempered glass screen protector according to claim 1, wherein the base is provided with a first hook, a second hook, a third protrusion, and a fourth protrusion;

the first hook and the second hook are located at two opposite ends of the mounting space, respectively;

the third protrusion and the fourth protrusion are respectively located at the two opposite ends of the mounting space and between the first hook and the second hook;

when the rolling rod moves relative to the base, the rolling rod is slidable into a position between the first hook and the third protrusion to limit reverse movement of the rolling rod relative to the base; and the rolling rod is allowed to break free from the limitation between the first hook and the third protrusion to move in reverse relative to the base and be clamped between the second hook and the fourth protrusion, wherein continued movement of the rolling rod relative to the base is limited.

6. The air bubble remover for the tempered glass screen protector according to claim 1, wherein the movable plate comprises a first housing and a second housing, the first housing and the second housing are detachably connected; two opposite ends of the first housing are respectively movably connected to two opposite sides of the base; the second housing is configured to cover the drive motor between the first housing and the second housing; and the rolling rod is rotatably connected to the first housing to make the rolling rod rotatable around the central axis of the rolling rod.

7. The air bubble remover for the tempered glass screen protector according to claim 1, wherein the air bubble remover further comprises a mounting frame; the mounting frame is adapted to the mounting space in terms of shape and detachably provided in the mounting space; the mounting frame is provided with a mounting trough for mounting the electronic device; and the mounting trough is adapted to the electronic device in terms of size.

8. An air bubble remover for a tempered glass screen protector, comprising:

a base, provided with a mounting space for mounting an electronic device; and a rolling rod, rotatably connected to the base and rotatable around a central axis of the rolling rod, wherein the rolling rod is automatically movable from a first side of the mounting space across the mounting space to a second side of the mounting space to remove a remaining air bubble between a tempered glass screen protector and the electronic device; and wherein the base is provided with first clamping posts;

the first clamping posts are configured to clamp the tempered glass screen protector to limit movement of the tempered glass screen protector;

the air bubble remover further comprises a limiting element;

an end of the limiting element is rotatably connected to the base; and the limiting element is rotatable relative to the base and clamped to the first clamping posts to prevent the tempered glass screen protector from detaching from the first clamping posts.

9. The air bubble remover for the tempered glass screen protector according to claim 8, wherein the first clamping posts each are provided with a limiting hole, and the limiting element is provided with clamping elements; and when the limiting element is clamped to the first clamping posts, the clamping elements are stored in the limiting holes to limit reverse rotation of the limiting element relative to the base to prevent the limiting element from detaching from the first clamping posts.

10. The air bubble remover for the tempered glass screen protector according to claim 9, wherein the first clamping posts are arranged side by side along a width direction of the base; the limiting element is provided with a perforation; and when the limiting element is clamped to the first clamping posts, one of the clamping elements is stored in the limiting hole of one of the first clamping posts, and an end of another one of the first clamping posts passes through the perforation to clamp the limiting element.

11. The air bubble remover for the tempered glass screen protector according to claim 8, wherein the base is further provided with a second clamping post; the second clamping post is located at a side of the base opposite from the first clamping posts and at the second side of the mounting space; and the second clamping post is clamped to an end of the tempered glass screen protector opposite from the first clamping posts to limit movement of the tempered glass screen protector along the two opposite sides of the mounting space.

12. An applicator for a tempered glass screen protector of an electronic device, comprising:
a tempered glass screen protector; and
the air bubble remover for the tempered glass screen protector according to claim 1, wherein the electronic device is placed in the mounting space, and the tempered glass screen protector is adhered to a display screen of the electronic device; and when the rolling rod moves, the rolling rod rolls along a surface of the tempered glass screen protector and compresses the tempered glass screen protector to remove the remaining air bubble between the tempered glass screen protector and the electronic device.

13. The applicator for the tempered glass screen protector of the electronic device according to claim 12, wherein the tempered glass screen protector comprises a screen protector body, a protective layer, and a release layer;
the protective layer and the release layer are respectively bonded to two opposite sides of the screen protector body;
the protective layer is located at the side of the screen protector body opposite from the electronic device;
two opposite sides of the protective layer are respectively provided with a first limiting portion and a second limiting portion;
the first limiting portion and the second limiting portion are respectively clamped to the two opposite sides of the base to limit the screen protector body and the release layer between the protective layer and the electronic device;
the release layer is provided with a movable end extending out of the screen protector body; and
the movable end is allowed to drive the release layer to detach from the screen protector body, wherein a bonding surface of the screen protector body is adhered to the display screen of the electronic device.

14. The applicator for the tempered glass screen protector of the electronic device according to claim 13, wherein the release layer comprises a release layer body and a pull tab;
the release layer body of the release layer is bonded to the side of the screen protector body opposite the protective layer;
the pull tab comprises a first end and a second end, wherein the first end is connected to an end of the release layer body and located at a side of the release layer body opposite from the screen protector body, and the second end extends out of the screen protector body;
the second end of the pull tab forms the movable end; and
the movable end is configured to be pulled to make the pull tab drive the release layer body to detach from the screen protector body, making the bonding surface of the screen protector body adhered to the display screen of the electronic device.

15. The applicator for the tempered glass screen protector of the electronic device according to claim 13, wherein the first limiting portion and the second limiting portion are respectively provided with a first clamping hole and a second clamping hole; and the first clamping hole and the second clamping hole allow the base to pass through, wherein the two opposite sides of the base are respectively clamped to the first limiting portion and the second limiting portion.

\* \* \* \* \*